United States Patent [19]

Adams et al.

[11] Patent Number: 5,533,608
[45] Date of Patent: Jul. 9, 1996

[54] QUICK-CHANGE CENTER STAR ASSEMBLY FOR A CAPPING MACHINE

[75] Inventors: Edgar E. Adams, Fountain City; Darwin L. Ellis; Gerald E. Stelle, both of Richmond, all of Ind.

[73] Assignee: Aluminum Company of America, Pittsburgh, Pa.

[21] Appl. No.: 333,738

[22] Filed: Nov. 3, 1994

[51] Int. Cl.⁶ .................................................. B65G 29/00
[52] U.S. Cl. .................................... 198/478.1; 198/480.1
[58] Field of Search .............................. 198/478.1, 479.1, 198/480.1; 53/201, 272, 276, 334

[56] References Cited

U.S. PATENT DOCUMENTS

| | | | |
|---|---|---|---|
| 1,017,038 | 2/1912 | Champ | 198/478.1 X |
| 2,500,465 | 3/1950 | Meyer | 198/478.1 |
| 3,036,693 | 5/1962 | Glocker | 198/478.1 X |
| 3,760,561 | 9/1973 | Over et al. | |
| 3,771,283 | 11/1973 | Over et al. | |
| 3,889,451 | 6/1975 | Burkhardt . | |
| 4,075,086 | 2/1978 | Marsh, III et al. | 198/480.1 X |
| 4,086,747 | 5/1978 | Gorton et al. | |
| 5,056,650 | 10/1991 | Kronseder | 198/480.1 X |
| 5,373,934 | 12/1994 | Jackson et al. | 198/480.1 X |

FOREIGN PATENT DOCUMENTS 9416976   8/1994   WIPO ................................. 198/480.1

*Primary Examiner*—James R. Bidwell
*Attorney, Agent, or Firm*—Dressler Goldsmith Shore & Milnamow Ltd.

[57] ABSTRACT

A center star assembly for use with a capping machine where the center star assembly can be quickly removed from the capping machine and replaced with another center star assembly for handling different size bottles or containers without having to remove and reinstall any fasteners or other mounting components.

9 Claims, 4 Drawing Sheets

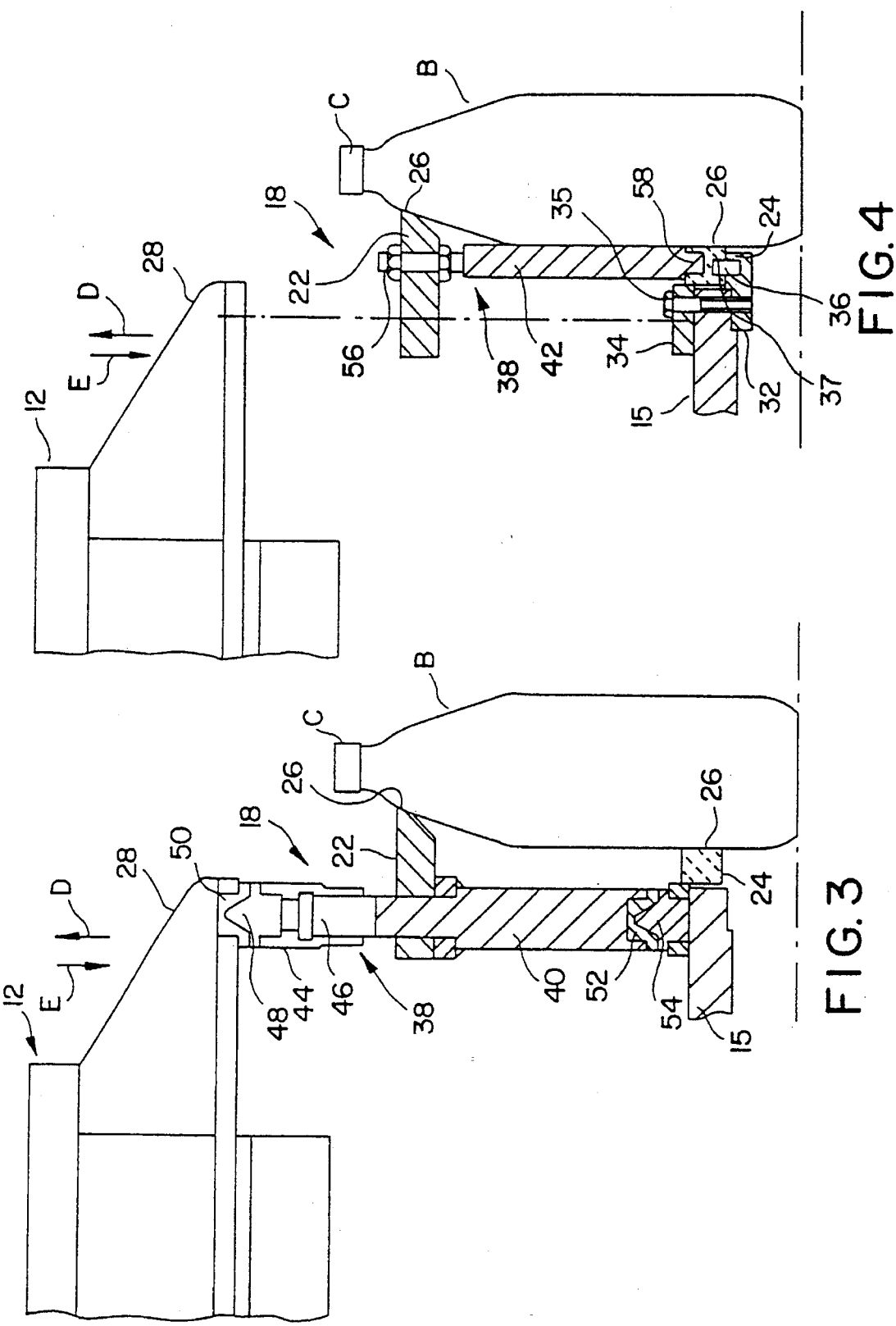

QUICK-CHANGE CENTER STAR ASSEMBLY FOR A CAPPING MACHINE

TECHNICAL FIELD

The present invention relates generally to container-handling equipment, and more particularly to a center star assembly for use with a container-handling apparatus, such as a bottle capping machine, where the center star assembly can transport and hold a bottle during capping and readily can be removed from the capping machine and replaced with another center star assembly for handling different size bottles without having to remove and reinstall any fasteners or other mounting components.

BACKGROUND OF THE INVENTION

Bottle-handling equipment, such as closure-applying capping machines, must be configured for reliable, high-speed handling of containers, such as bottles or the like. While the particular configuration of such equipment will depend upon the specific containers or bottles being handled, as well as the specific closures being applied thereto, many applications require that each individual bottle be transported beneath a turret assembly which applies the closures in a continuous operation.

Transporting a bottle beneath a closure applying turret assembly typically is accomplished by a rotatable star wheel or center star wheel of the apparatus where the center star wheel includes an assembly for holding each bottle as it is conveyed during capping. As the bottle is moved by the center star wheel, a closure is provided to the bottle and a capping head of the turret assembly applies the closure to the bottle. After capping, the bottle is typically transferred to an output star wheel of the apparatus for subsequent handling, packaging, storage, and shipment.

Center star wheel assemblies typically include a plurality of pockets about their peripheries, one pocket each for a respective bottle. Each pocket of the center star wheel assembly includes top and bottom ledges for contact with the outside surface of each bottle near the top and bottom of the bottle. The top and bottom ledges engage the bottle during handling and conveying and typically are formed from plastic or similar material.

The top and bottom ledges of existing center star wheel assemblies are secured to a rotary table of the capping machine by numerous fasteners, spacers, mounting plates, and other components. In order to adjust the center star assembly to handle bottles of different sizes or to replace a worn center star assembly, the top ledge, bottom ledge, or both, must be removed and replaced along with other mounting fasteners and components.

The adjusting of center star assemblies is difficult and time consuming due to the number of fasteners, spacers and other components which must be removed and replaced. The close confines of the capping machine and associated bottle transporting mechanisms further complicate the adjustment procedure.

It therefore would be desirable to provide a center star assembly for use with a capping machine which can hold and transport a bottle or other container during application of an associated closure where the center star assembly readily can be replaced with another center star assembly for handling different size bottles or to replace a worn center star assembly where no fasteners or other mounting components are required to be removed and reinstalled.

SUMMARY OF THE INVENTION

A center star assembly configured in accordance with the present invention is particularly suited for use with a high-speed bottle handling apparatus such as a closure-applying capping machine. The center star assembly substantially is assembled remote from the capping machine and readily can be mounted and secured to the capping machine without requiring any fasteners or other mounting components.

In a preferred form of the invention, the capping machine includes a rotary table and a turret hub which include mounts for the center star assembly Where the turret hub is mounted for rotation along with the rotary table and for axial movement with respect to the rotary table. After positioning a desired center star assembly on the rotary table, the turret hub is moved axially toward the rotary table to capture the center star assembly between the turret hub and the rotary table.

The center star assembly is preferably formed in two semicircular portions, each portion including top and bottom ledges for engagement with respective top and bottom side portions of a bottle or other container. The bottom ledge is preferably separate from the remaining portions of each semicircular portion of the center star assembly, but can be secured thereto if desired.

Other features and advantages of the present invention will become readily apparent from the following detailed description, the accompanying drawings, and the appended claims.

BRIEF DESCRIPTION OF THE DRAWINGS

FIG. 3 is an enlarged partial cross-sectional view of a portion of the center star wheel assembly of the invention taken along line 3—3 of FIG. 2 and in the direction indicated illustrating a portion of the center star wheel assembly, rotary table and turret assembly;

FIG. 4 is an enlarged partial cross-sectional view of another portion of the center star wheel assembly of the invention taken along line 4—4 of FIG. 2 and in the direction indicated illustrating another portion of the center star wheel assembly, rotary table, and turret assembly;

DESCRIPTION OF THE PREFERRED EMBODIMENT

Figure 1:
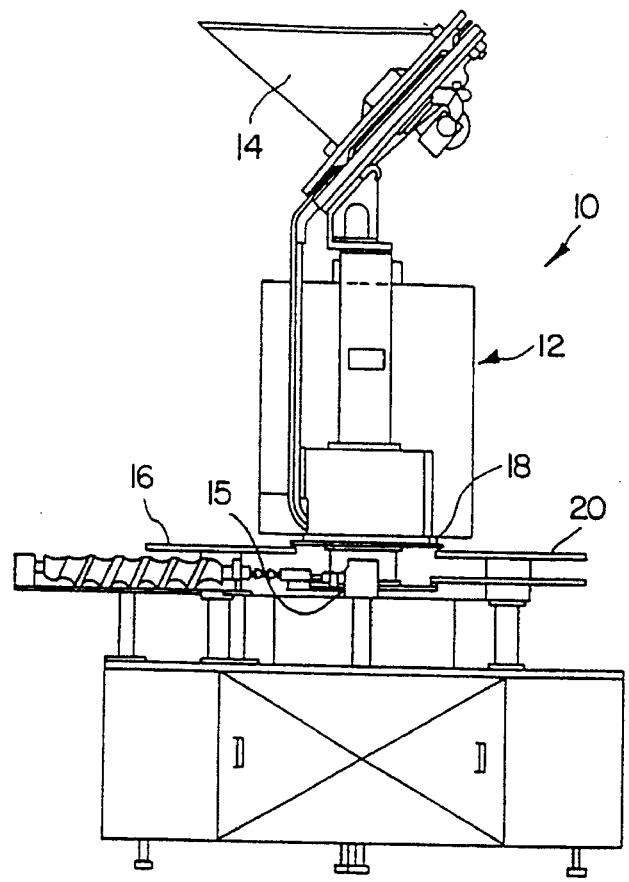
FIG. 1 is a perspective view of a container-handling apparatus, illustrated as a bottle capping machine, with which the present invention can be used.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

For ease of description, the method and apparatus of this invention is described in the normal, upright, operating position and terms such as upper, lower, horizontal etc. are utilized with reference to this position. It will be understood, however, that the apparatus of this invention may be manufactured, stored, transported and sold in an orientation other than the position described.

Some of the figures illustrating the embodiments of the apparatus of the present invention show conventional components, structural details and mechanical elements that will be recognized by one skilled in the art. The detailed descriptions of such elements, however, are not necessary to an understanding of the invention and, accordingly, are not presented herein.

With reference to FIG. 1, a bottle handling apparatus is designated generally by the reference numeral 10. The bottle handling apparatus 10 is illustrated as a closure-applying capping machine which is illustrative of the type of apparatus with which the present invention is particularly suited for use. The capping machine 10 is illustrated as a "roll on" or "crowner" type of machine, but can vary, such as for application of threaded plastic closures.

The capping machine 10 includes a turret assembly 12 including a plurality of rotatable capping heads (not illustrated) which receive closures or caps C from an associated feed hopper 14 for respective application to bottles B or other containers. The capping machine 10 also includes a rotary table generally designated with the reference numeral 15 positioned beneath the turret assembly 12 which rotates with the turret assembly 12 as described below.

Handling of the bottles B is effected via rotatable "star wheel" assemblies of the capping machine 10, including an input star wheel assembly 16, a center star wheel assembly 18 and an output star wheel assembly 20. The center star wheel assembly 18 is positioned beneath the turret assembly 12 and holds and transports the bottles B during application of the closures C while the output star wheel assembly 20 guides the sealed bottles from the capping machine 10 for packaging or the like.

Figure 2:
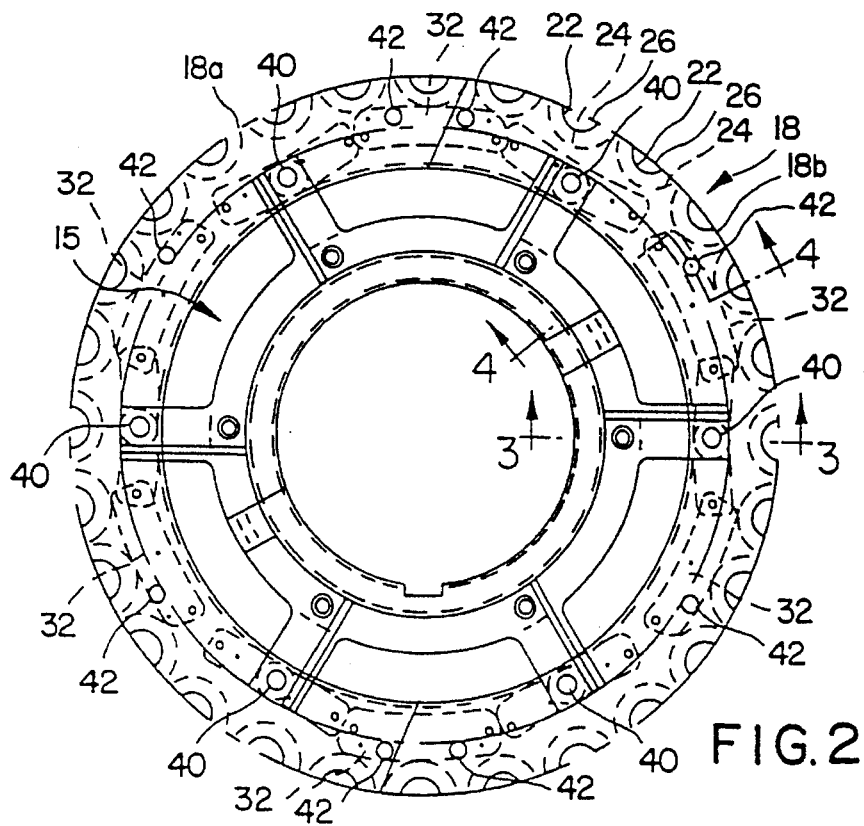
FIG. 2 is a top plan view of a turret assembly, center star wheel assembly, and rotary table of the invention for use with the bottle capping machine illustrated in FIG. 1 with various components of the center star wheel assembly and rotary table illustrated in dotted lines.

The center star wheel assembly 18 is illustrated in a typical configuration in FIGS. 2–4 and is designed for "quick change" to substitute another center star wheel assembly for handling of different size bottles or to replace worn components of the center star wheel assembly 18. Accordingly, as FIGS. 2 and 5 illustrate, the center star wheel assembly 18 is preferably formed in two substantially identical semicircular portions 18a and 18b, each portion 18a and 18b including a top bottle support ledge 22 and a bottom bottle support ledge 24 both of which are substantially semicircular in shape.

In order to facilitate handling of bottles B, each of the star wheel portions 18a and 18b of the center star wheel assembly 18 are configured to define a plurality of circumferentially spaced cavities or pockets 26 about their outer peripheries. Each pocket 26 is defined by the top and bottom ledges 22 and 24 and is designed to receive a respective bottle B during handling, and in particular, during respective application of closures C thereto. The top and bottom ledges 22 and 24 are preferably formed from plastic or similar material and cooperate with one or more guides (not illustrated) which act to urge each bottle B into a respective one of the pockets 26.

Figure 5:
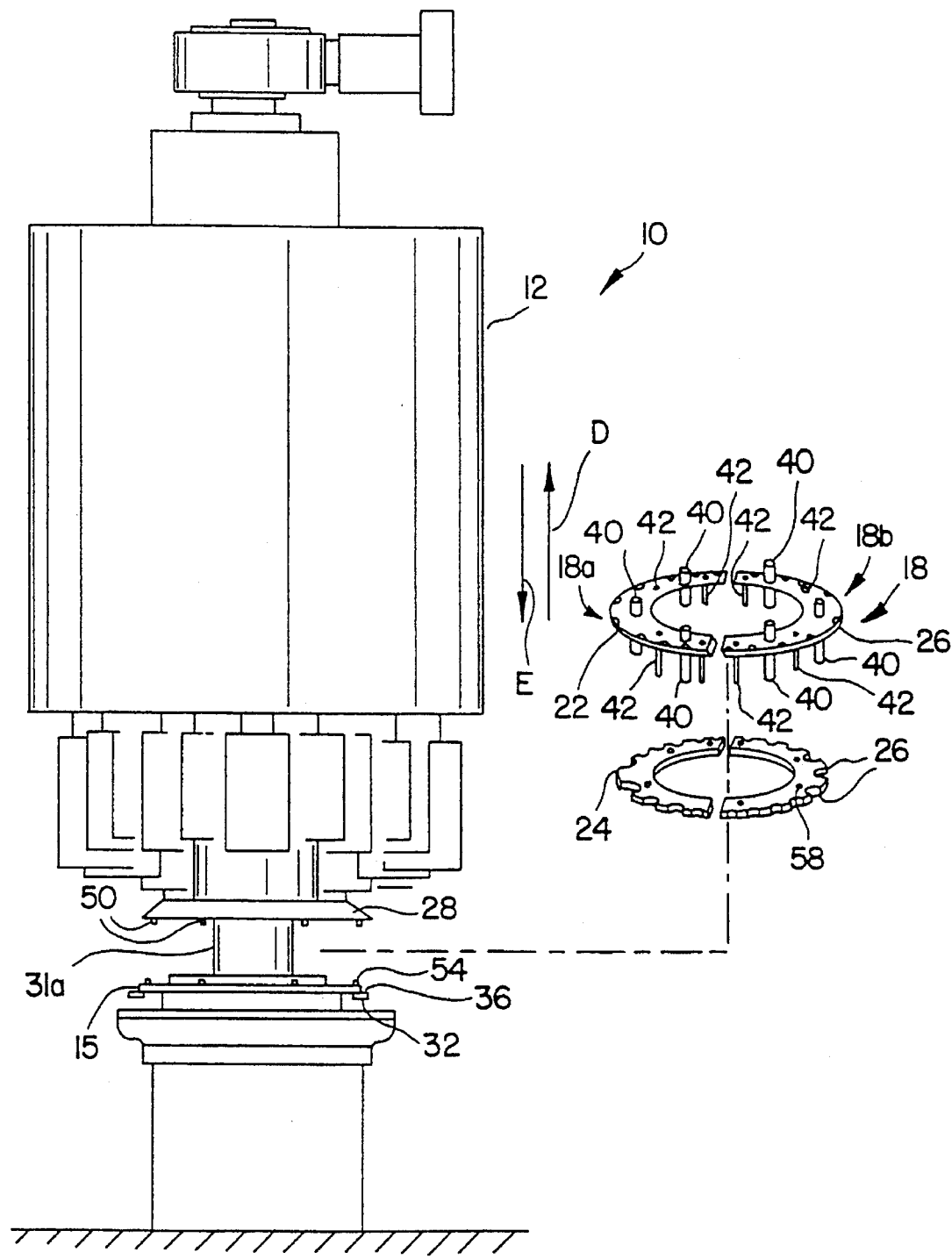
FIG. 5 is a side elevational view of a turret assembly and rotary table of the invention illustrating the center star wheel assembly in an exploded manner and showing the positioning of the center star wheel assembly between the turret assembly and the rotary table.

As FIG. 5 illustrates, the star wheel portions 18a and 18b are inserted between the turret assembly 12 and the rotary table 15. When the turret assembly 12 is lowered toward the rotary table 15 in the direction of arrow "E", the star wheel portions 18a and 18b are captured therebetween.

When the star wheel portions 18a and 18b are to be changed, such as to run a different size bottle B or to replace worn components of the star wheel portions 18a and 18b, the turret assembly 12 is raised in the direction of arrow "D". The star wheel portions 18a and 18b are then replaced with alternate star wheel portions and the turret assembly 12 is lowered in the direction of arrow "E" to capture the alternate star wheel portions between the turret assembly 12 and the rotary table 15.

Figure 6:
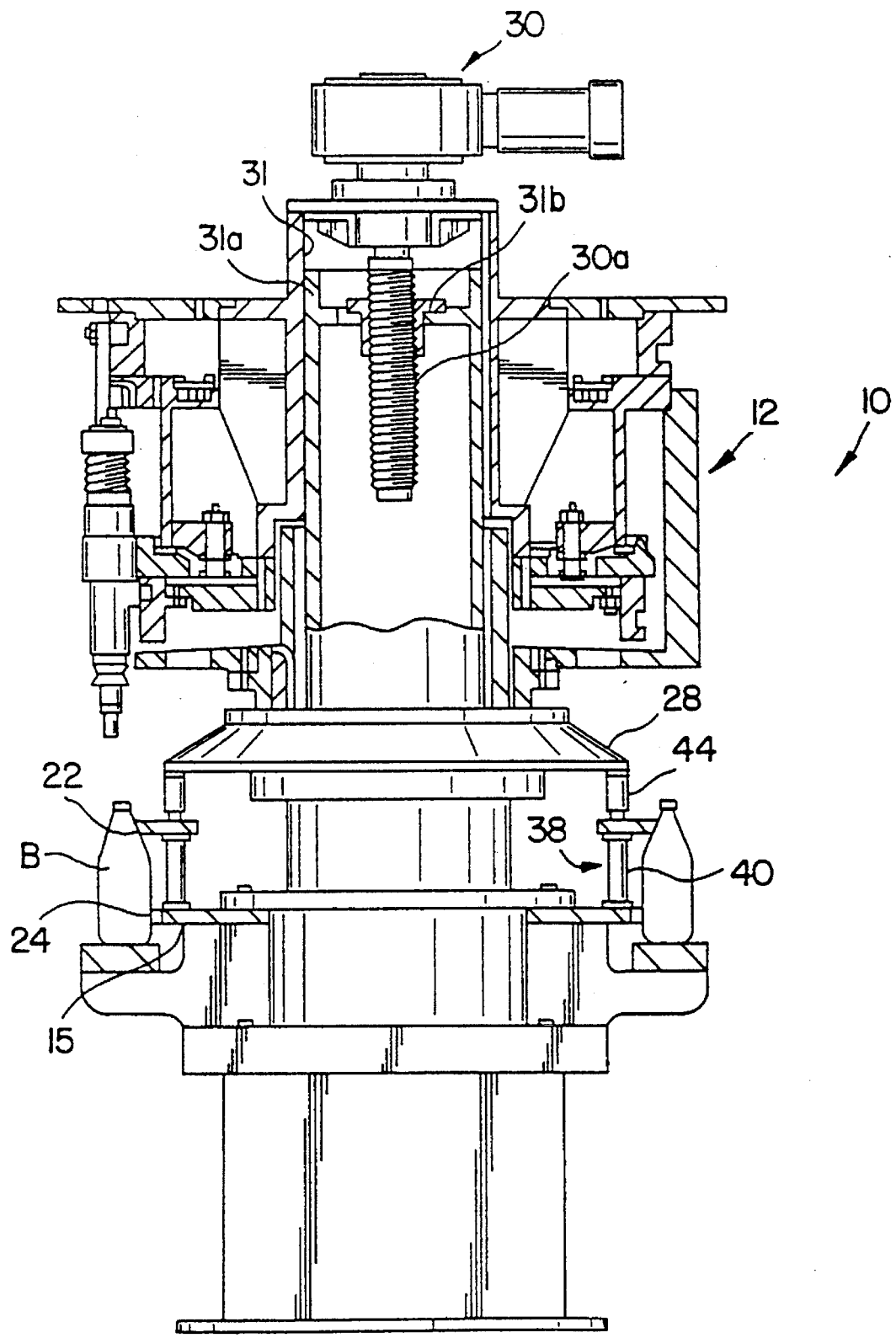
FIG. 6 is a side elevational view, in partial section, of the assembled turret assembly, rotary table and center star wheel assembly of FIG. 5 illustrating the mechanism for mounting the turret assembly to the rotary table for rotational and axial movement therebetween.

As FIGS. 3 and 4 illustrate, the turret assembly 12 includes a turret hub 28 which moves up and down with the turret assembly 12 in the direction of arrows "D" and "E", respectively, to capture and provide access to the star wheel portions 18a and 18b of the center star wheel assembly 18. As FIG. 6 illustrates, axial movement of the turret assembly 12 and the turret hub 28 is accomplished by a drive motor 30 and associated screw drive member 30a.

The turret assembly 12 includes an axial aperture 31 extending therethrough for mounting over a rotatable sleeve 31a of the rotary table 15 which is rotated by an associated drive motor (not illustrated) in the base of the capping machine 10. Accordingly, the turret assembly 12 rotates with the sleeve 31a of the rotary table 15 and moves axially with respect to the sleeve 31a and rotary table 15 upon activation of the drive motor 30 which turns screw drive member 30a for axial movement with respect to a bushing 31b secured to the sleeve 31a.

This axial movement enables raising and lowering of the turret assembly 12 in the direction of arrows "D" and "E", respectively, for replacing and retaining the star wheel portions 18a and 18b for different size bottles B. The turret assembly 12 preferably moves axially within a range of between 1—12 inches, but can vary depending on a variety of factors, including the particular size bottle B being run.

As FIG. 2 illustrates, in order to connect the bottom ledge 24 for operable communication with the turret assembly 12 and as distinguished from known constructions, the rotary table 15 includes six mounting plates 32 positioned about its periphery. The mounting plates 32 are connected to the rotary table 15 by two mounting plates 34 and fasteners 35 (illustrated in FIG. 4) and include a pin 36 for mounting within an associated recess 37 in the bottom ledge 24.

When the turret assembly 12 and associated turret hub 28 are positioned in the lowered or engaged position illustrated in FIGS. 3 and 4, the top ledge 22 of the center star wheel assembly 18 is retained between the bottom ledge 24 and the turret hub 28 by a top ledge mounting assembly generally designated by the reference numeral 38. As described in detail below, the mounting assembly 38 maintains contact between the turret hub 28 and the bottom ledge 24 in seven positions about each star wheel portion 18a and 18b, three positions provided by mounting rods or plates 40 and four positions provided by retainer shafts 42.

Thus, when the star wheel portions 18a and 18b are assembled to form the star wheel assembly 18, the mounting assembly 38 connects the turret hub 28 to the bottom ledge 24 in fourteen positions about the periphery of the center star wheel assembly 18. Six of the positions are provided by the mounting rods 40 and eight of the positions are provided by the retainer shafts 42.

As FIGS. 2, 3 and 5 illustrate, the six mounting rods 40 are positioned substantially equidistant about the periphery of the top support ledge 22 of the center star assembly 18. Each mounting rod 40 includes an adjusting screw 44 and a set screw 46 which adjustably secure a top male alignment cone locator 48 to a top end of the mounting rod 40.

Each top male cone locator 48 seats within a corresponding top female alignment cone locator or socket 50 secured to the turret hub 28. The opposite bottom end of each mounting rod 40 includes a bottom female cone locator or socket 52 connected thereto which seats within a corresponding bottom male cone locator 54 connected to the rotary table 15.

As FIGS. 2, 4 and 5 illustrate, the eight retainer shafts 42 are positioned about the center star wheel assembly 18 with two retainer shafts 42 within each quadrant of the center star wheel assembly 18 and are connected at a top end to the top ledge 22 by fasteners 56. A bottom end of each retainer shaft 42 seats within a recess 58 formed with the bottom ledge 24.

In order to mount a center star wheel assembly 18 to the capping machine 10, the turret assembly 12 is first positioned by the drive motor 30 in an open or disengaged position illustrated in FIG. 5 which would be above the position illustrated in FIGS. 3 and 4 in the direction of arrow "D". In this position, the turret hub 28 includes the top female cone locators 50 secured thereto while the rotary table 15 includes the bottom male locators 54, the mounting plates 32 and 34 and the mounting pins 36 secured thereto.

Next, each semicircular portion of the bottom ledge 24 is positioned about the sleeve 31a of the rotary table 15 and over the mounting pins 36 which fit within recesses 37 causing the bottom ledge 24 to seat against the mounting plates 32. The semicircular portions of the top ledge 22 and attached mounting assembly 38 then are positioned about the sleeve 31a of the rotary table 15 between the turret hub 28 and the bottom ledge 24 with the bottom female cone locators 52 of the mounting rods 40 of the top ledge 22 aligning with the bottom male locators 54 of the rotary table 15. At the same time, the bottom end of each retainer shaft 42 is aligned with a respective recess 58 in the bottom ledge 24.

The turret assembly 12 is then lowered on the sleeve 31a of the rotary table 15 by the drive motor 30 in the direction of arrow "E" to the closed or engaged position illustrated in FIGS. 3 and 4 for a particular bottle size to be run. In this position, each top male cone locator 48 of each mounting rod 40 seats within a corresponding female cone locator 50 of the turret hub 28 with the top ledge 22, mounting assembly 38, and bottom ledge 24 of each star wheel portion 18a and 18b being compressed and retained between the turret hub 28 and the rotary table 15.

When the turret assembly 12 is in the engaged position, a degree of adjustability for a snug fit can be provided between the top male and female locators 48 and 50, as well as the bottom male and female locators 52 and 54, by manipulating the adjusting screw 44 as desired. Such manipulation of the adjusting screw 44 can be accomplished to increase or decrease the effective length of each mounting rod 40 and provide the desired fit.

When a different size bottle is to be run or worn parts need replaced on the center star wheel assembly 18, the turret hub 28 is disengaged by moving the turret assembly 12 upward by the drive motor 30 in the direction of arrow "D" which unseats the top female cone locator 50 from the top male cone locator 48. The top ledge 22 and associated mounting assembly 38 of each star wheel portion 18a and 18b are then removed and replaced with similar, alternate star wheel portions each having a top ledge 22 and mounting assembly 38 designed for handling a different size bottle or new parts.

If desired, before reinstalling the top ledge 22 and mounting assembly 38 of the alternate star wheel portions, the semicircular portions of the bottom ledge 24 can be removed by pulling them off the pins 36 and replacing them with similar, alternate semicircular portions of the bottom ledge 24 designed for handling a different size bottle in cooperation with the top ledge 22. Once the top ledge 22, mounting assembly 38 and bottom ledge 24 of each star wheel portion 18a and 18b are in position, the turret assembly 12 and turret hub 28 are lowered by the drive motor 30 to provide a compression fit between the turret hub 28, the center star wheel assembly 18 and the rotary table 15.

The alternate star wheel portions including the top ledge 22 and mounting assembly 38 are preferably assembled and stored remote from the capping machine 10 prior to use to substantially reduce change-over time. Additionally, the design of the center star wheel assembly 18 enables existing capping machines 10 to be retrofitted with the assembly of the present invention with minimal modifications.

From the foregoing, it will be observed that numerous modifications and variations can be effected without departing from the true spirit and scope of the novel concept of the present invention. It will be understood that no limitation with respect to the specific embodiments is intended or should be inferred. The disclosure is intended to cover, by the appended claims, all such modifications as fall within the scope of the claims.

What is claimed is:

1. A capping machine for securing closures on containers having a center star assembly which can be quickly removed and replaced with another center star assembly substantially without the use of fasteners comprising:

a rotary table;

a turret hub;

a center star assembly for receiving a plurality of containers and transporting said containers beneath said turret hub during capping; and connecting means for retaining said center star assembly to said turret hub and said rotary table and for enabling rotation of said center star assembly with said rotary table and said turret hub during capping of said containers.

2. A capping machine in accordance with claim 1 wherein said connecting means include means for moving said turret hub with respect to said rotary table from a first open position to a second closed position with said center star assembly being captured between said turret hub and said rotary table when said turret hub is positioned in said second closed position.

3. A capping machine in accordance with claim 1 wherein said center star assembly includes top and bottom ledges for engagement of respective top and bottom portions of a container.

4. A center star bottle handling assembly for use with a bottle capping machine where the assembly can be removed from the capping machine and replaced with another assembly for use with the same or different size bottles, comprising:

at least one bottle handling member; and connecting means for retaining said at least one bottle handling member to the capping machine in a releasable manner substantially without utilizing any fasteners, for enabling rapid removal of said at least one bottle handling member and for enabling replacement of said at least one bottle handling member with another bottle handling member, wherein said connecting means include a turret hub connected for rotation with respect to said capping machine and further connected for axial movement with respect to said capping machine to capture said at least one bottle handling member between said turret hub and a base member of said capping machine.

5. A center star bottle handling assembly in accordance with claim 4 wherein said at least one bottle handling member includes means for handling bottles of a first size and can be replaced with another bottle handling member including means for handling bottles of a second different size.

6. A center star bottle handling assembly in accordance with claim 4 wherein said base member of said capping machine is a rotary table.

7. A center star bottle handling assembly in accordance with claim 6 including alignment cones and associated sockets for cooperative engagement between said turret hub and said at least one bottle handling member and between said rotary table and said at least one bottle handling member.

8. A center star bottle handling assembly in accordance with claim 4 wherein said at least one bottle handling member includes top and bottom ledge members for engagement with respective top and bottom portions of said bottle.

9. A method of rapidly changing a bottle handling assembly of a capping machine for accepting bottles of different sizes, comprising the steps of:

providing a rotary table;

providing a turret hub operably connected for rotation with said rotary table and for axial movement with respect to said rotary table;

inserting a center star assembly between said turret hub and said rotary table, said center star assembly capable of handling at least one bottle; and moving said turret hub in an axial direction toward said rotary table to capture said center star assembly therebetween.

* * * * *